United States Patent
Vasseur et al.

(10) Patent No.: US 11,916,752 B2
(45) Date of Patent: Feb. 27, 2024

(54) CANCELING PREDICTIONS UPON DETECTING CONDITION CHANGES IN NETWORK STATES

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US); Pierre-André Savalle, Rueil-Malmaison (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/368,110

(22) Filed: Jul. 6, 2021

(65) Prior Publication Data
US 2023/0010641 A1   Jan. 12, 2023

(51) Int. Cl.
*H04L 41/147*   (2022.01)
*H04L 41/5009*   (2022.01)
*H04L 41/5025*   (2022.01)
*H04L 41/5067*   (2022.01)

(52) U.S. Cl.
CPC ........ *H04L 41/147* (2013.01); *H04L 41/5012* (2013.01); *H04L 41/5025* (2013.01); *H04L 41/5067* (2013.01)

(58) Field of Classification Search
None
See application file for complete search history.

(56) References Cited

U.S. PATENT DOCUMENTS

| | | | |
|---|---|---|---|
| 2014/0071832 A1* | 3/2014 | Johnsson | H04L 41/0677 370/242 |
| 2015/0195192 A1* | 7/2015 | Vasseur | H04L 45/28 714/47.3 |
| 2016/0026922 A1* | 1/2016 | Vasseur | G06N 5/048 706/12 |
| 2016/0028616 A1* | 1/2016 | Vasseur | H04L 47/50 370/412 |
| 2016/0205189 A1 | 7/2016 | Mopur et al. | |
| 2018/0006900 A1 | 1/2018 | Korycki et al. | |

(Continued)

OTHER PUBLICATIONS

Zhou et al. "A Prediction-Based Model for Consistent Adaptive Routing in Back-Bone Networks at Extreme Situations", MDPI. com, Dec. 15, 2020 [retrieved on Dec. 31, 2022]. Retrieved from the Internet: <URL: https://www.mdpi.com/2079-9292/9/12/2146>. (Year: 2020).*

(Continued)

*Primary Examiner* — Kevin T Bates
*Assistant Examiner* — Dae Kim
(74) *Attorney, Agent, or Firm* — BEHMKE INNOVATION GROUP LLC; James M. Behmke; James J. Wong

(57) ABSTRACT

In one embodiment, a device obtains an indication of a network event predicted by a routing engine for a network. The device initiates monitoring of one or more network paths associated with the network event, to determine one or more states of the network. The device makes a comparison between the one or more states of the network and a set of one or more constraints. The device provides a prediction cancelation notification to the routing engine, based on the comparison.

18 Claims, 10 Drawing Sheets

(56) References Cited

U.S. PATENT DOCUMENTS

| | | | |
|---|---|---|---|
| 2018/0176134 A1* | 6/2018 | Pignataro | H04L 69/22 |
| 2019/0138938 A1* | 5/2019 | Vasseur | G06N 3/088 |
| 2019/0280942 A1 | 9/2019 | Côté et al. | |
| 2020/0022016 A1* | 1/2020 | Fenoglio | H04W 28/0268 |
| 2020/0379839 A1* | 12/2020 | Savalle | H04L 12/4633 |
| 2020/0389371 A1 | 12/2020 | Tedaldi et al. | |
| 2021/0132927 A1 | 5/2021 | Dinh et al. | |

OTHER PUBLICATIONS

Nannapaneni, Rajasekhar. "Optimal Path Routing Using Reinforcement Learning", Dell website, Dec. 31, 2020 [retrieved on 2023-09-21]. < URL: https://education.dell.com/content/dam/dell-emc/documents/en-US/ 2020KS_Nannapaneni-Optimal_path_routing_using_Reinforcement_Learning.pdf>. (Year: 2020).*

\* cited by examiner

CANCELING PREDICTIONS UPON DETECTING CONDITION CHANGES IN NETWORK STATES

TECHNICAL FIELD

The present disclosure relates generally to computer networks, and, more particularly, to canceling predictions upon detecting condition changes in network states.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, doing so is not a zero-consequence action and can even cause more harm than good, such as when the prediction is incorrect. Indeed, predictions can become stale in the face of changes in the states of the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
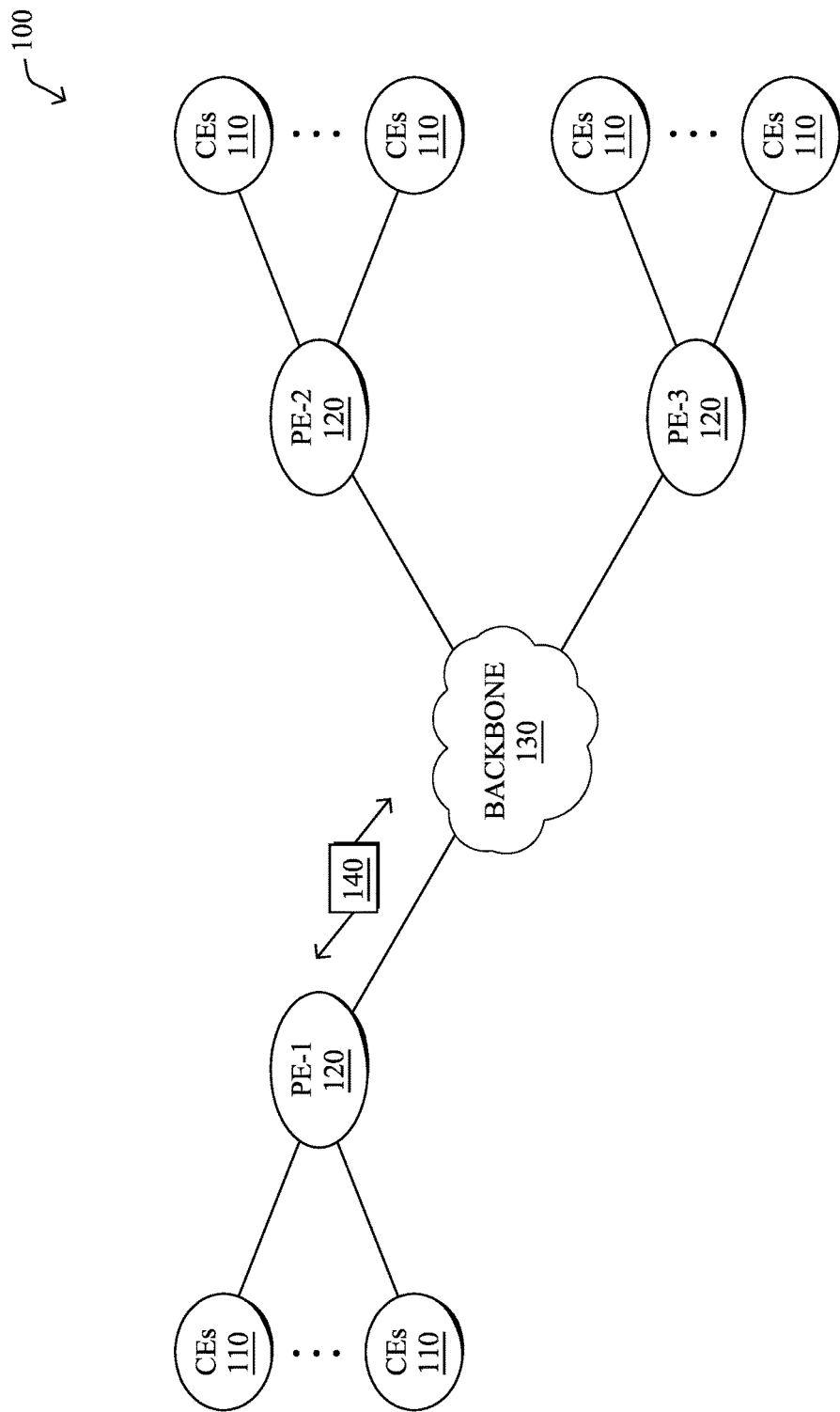
FIGS. 1A-1B illustrate an example communication network.

According to one or more embodiments of the disclosure, a device obtains an indication of a network event predicted by a routing engine for a network. The device initiates monitoring of one or more network paths associated with the network event, to determine one or more states of the network. The device makes a comparison between the one or more states of the network and a set of one or more constraints. The device provides a prediction cancelation notification to the routing engine, based on the comparison.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
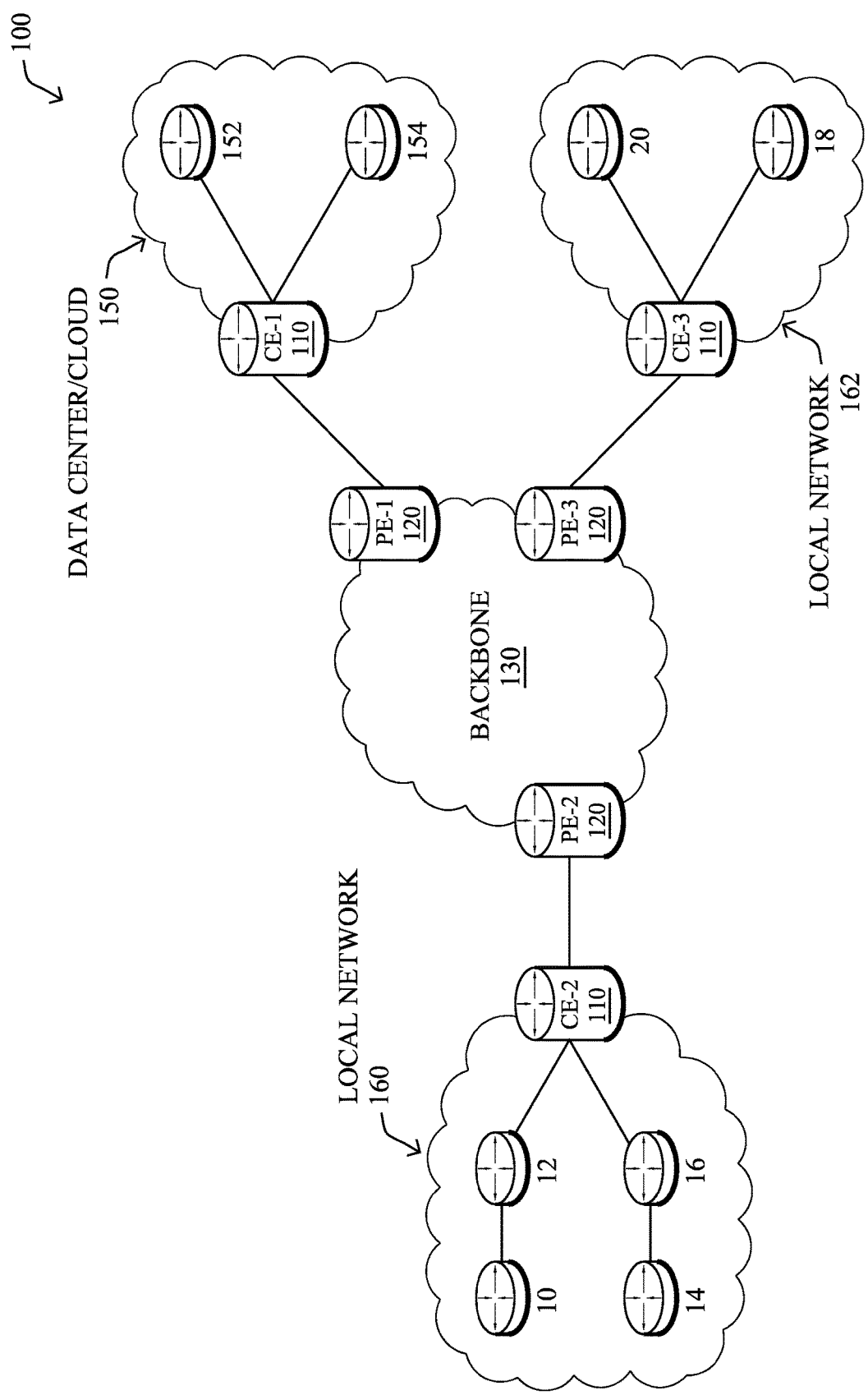

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
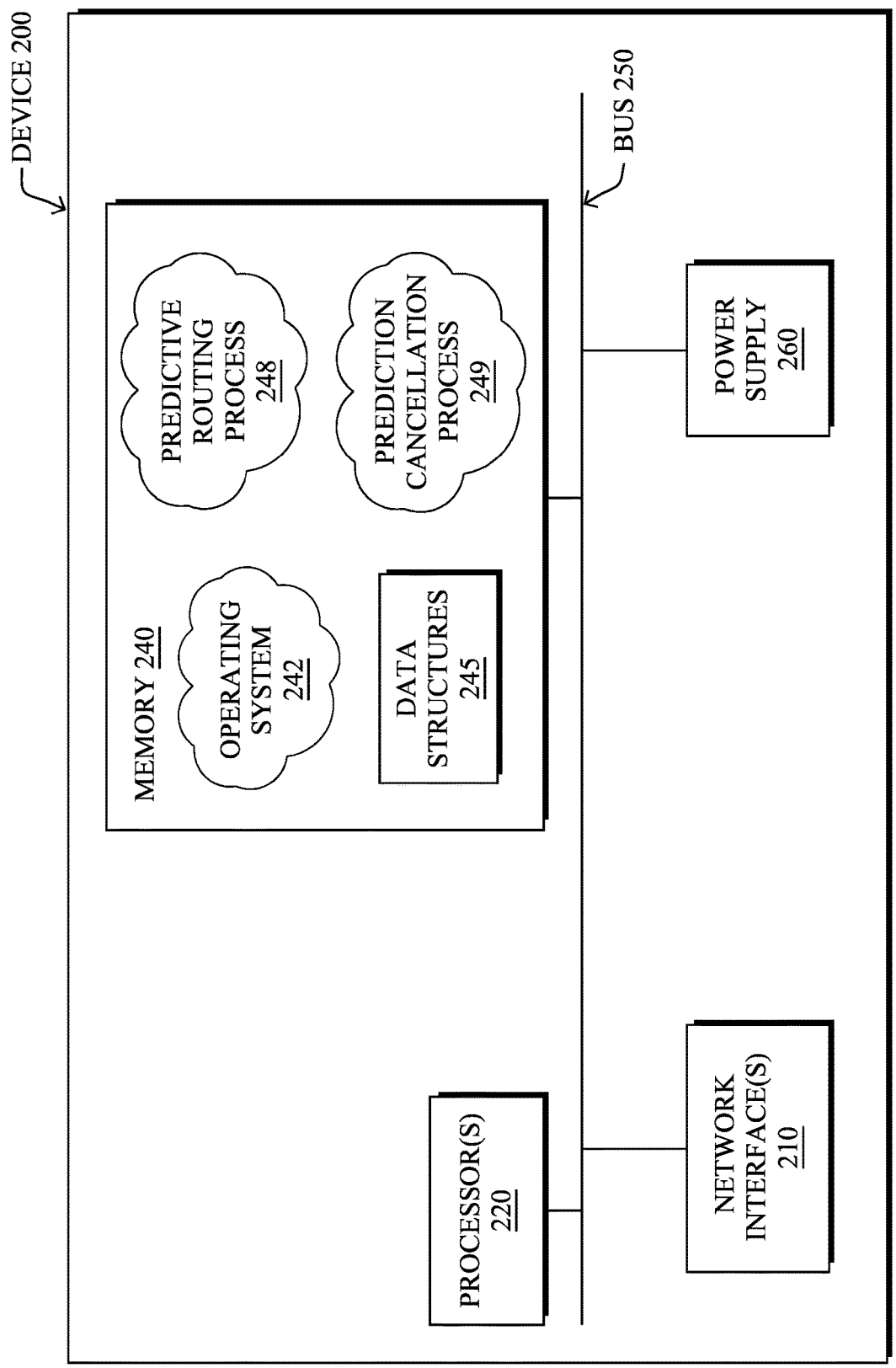
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a prediction cancelation process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 and/or a prediction cancelation process 249 may include computer executable instructions that, when executed by processor(s) 220, cause device 200 to perform the techniques described herein. To do so, in some embodiments, predictive routing process 248 and/or a prediction cancelation process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or a prediction cancelation process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or a prediction cancelation process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
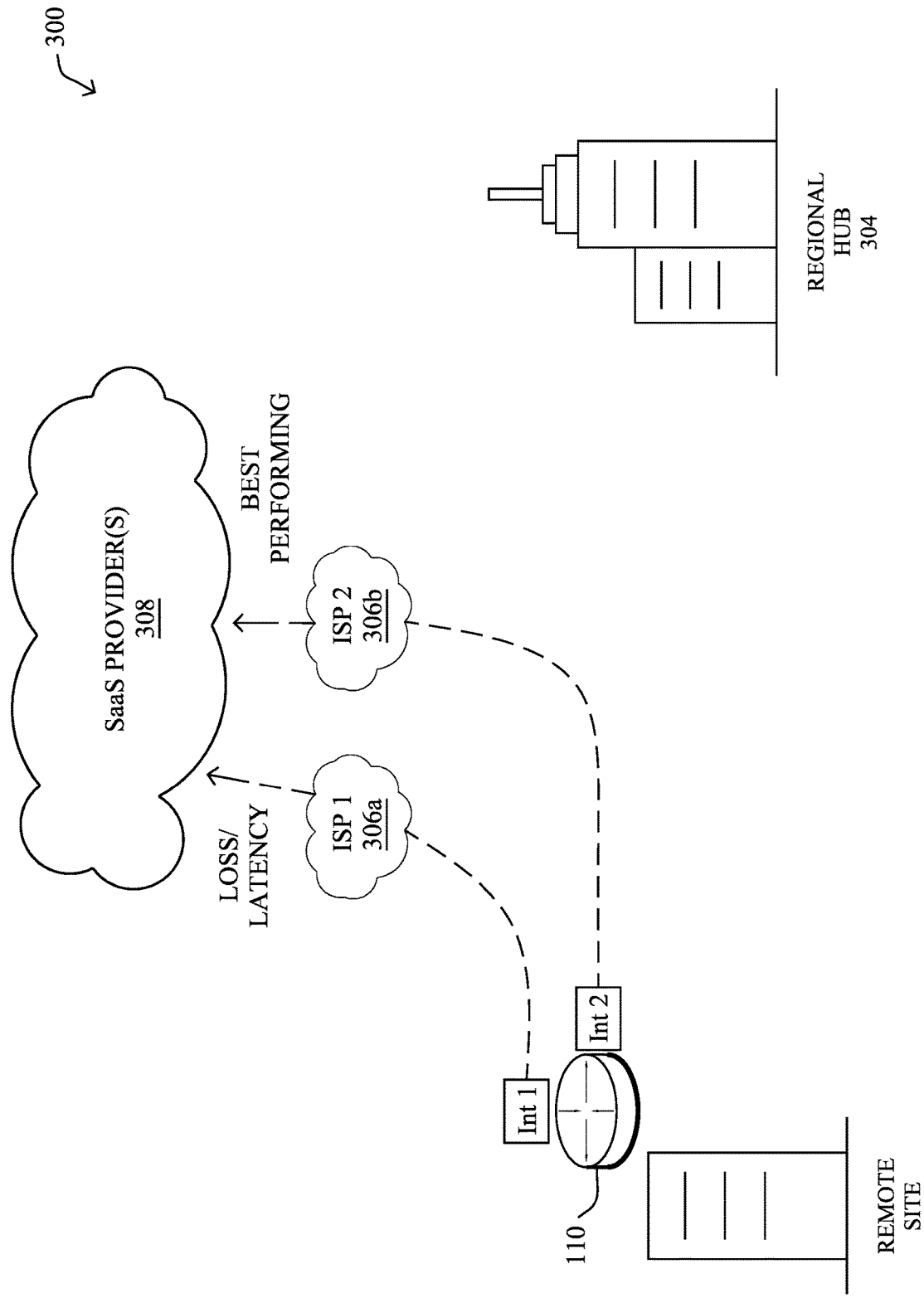
FIGS. 3A-3B illustrate example network deployments.
Figure 3B:
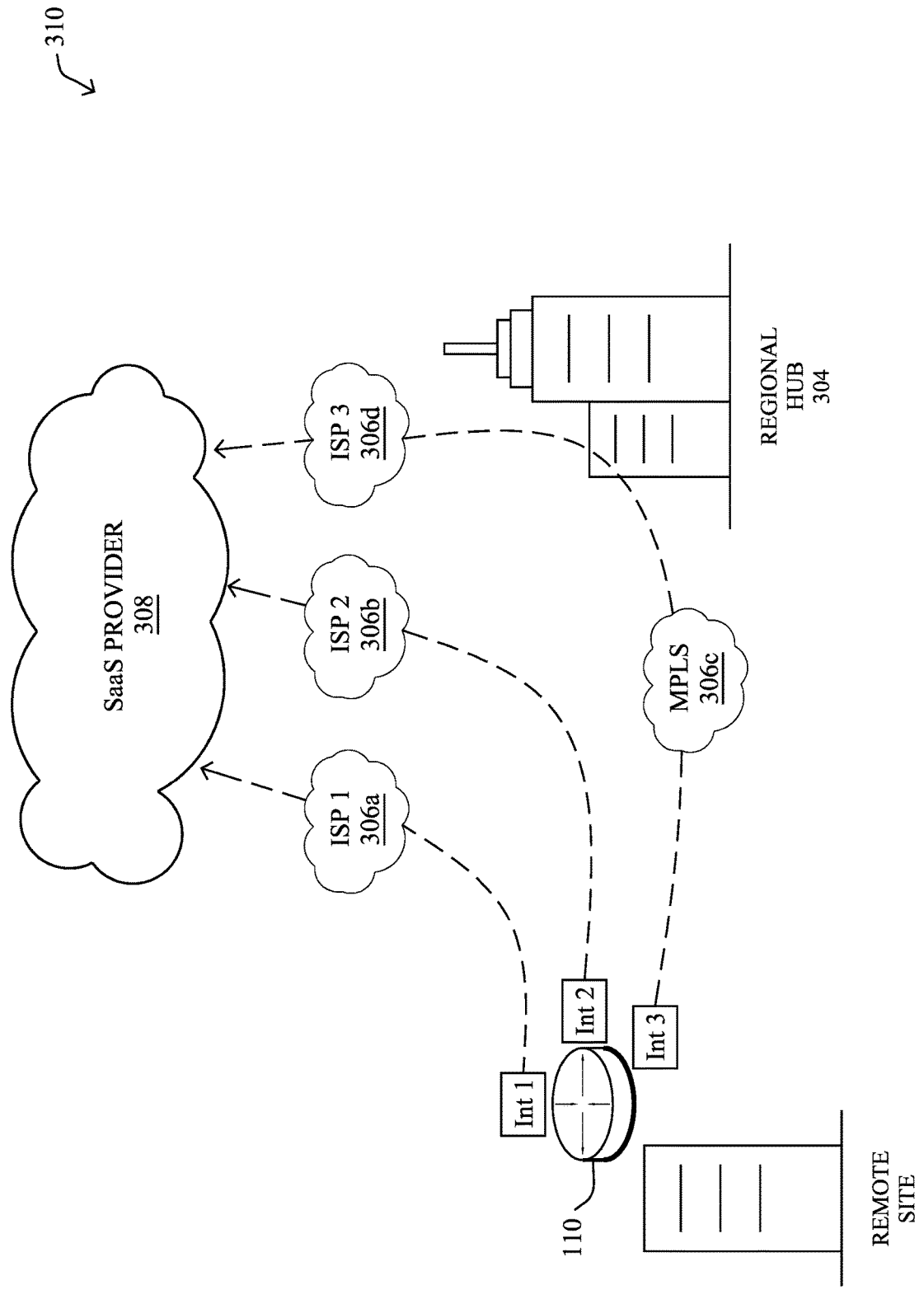

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
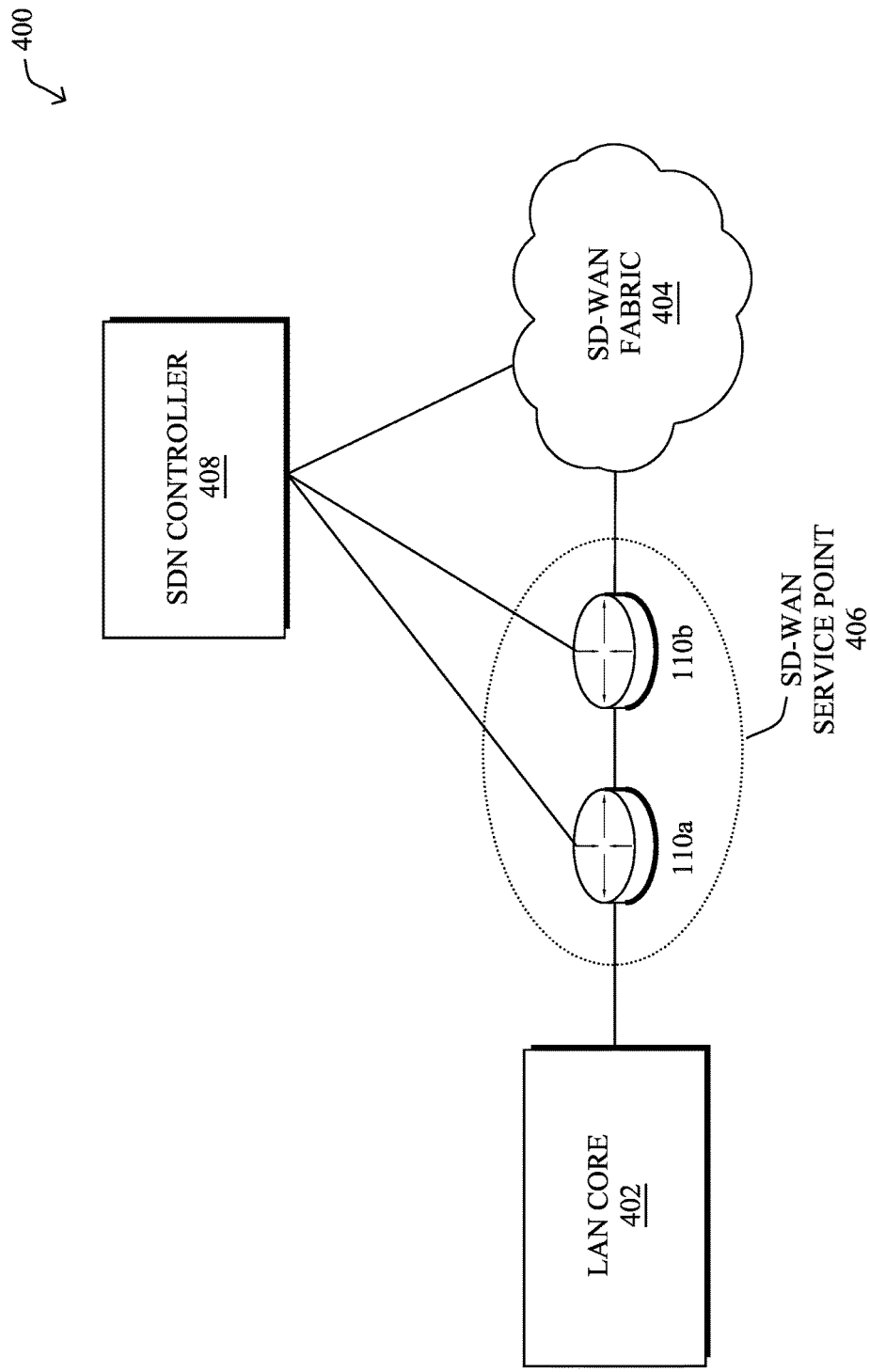
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
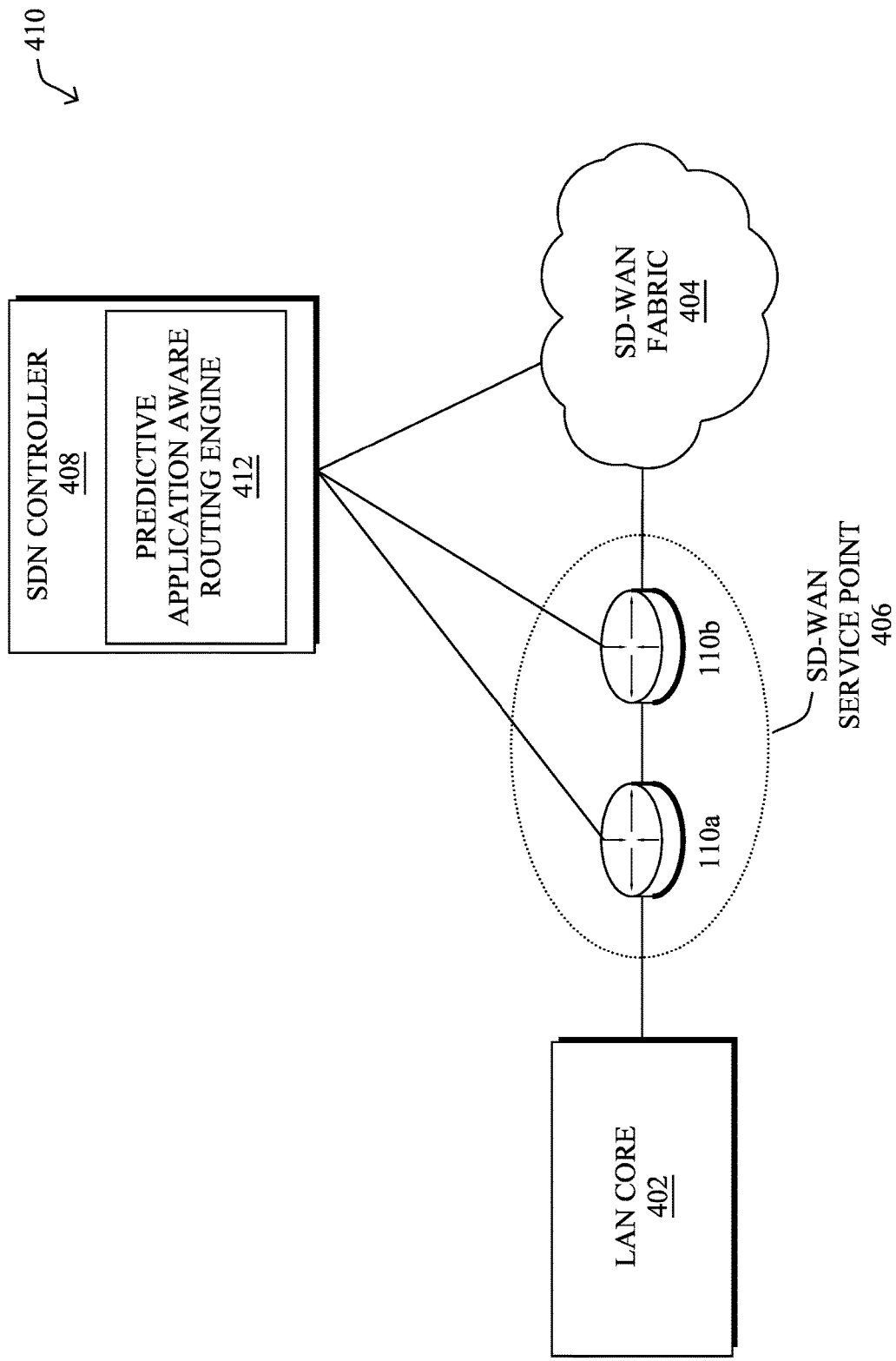

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, a predictive routing engine, such as predictive application aware routing engine 412, may receive network telemetry data from a wide range of sources such as probe reports, SD-WAN measurements, or the like. In turn, the predictive routing engine may construct predictive models to perform a regression of application QoE in the future and, for example, predict the probability of an SLA violation along a given path and suggest a path less likely to exhibit similar issues. In further instances, the predictive routing engine may also leverage closed-loop automation by proactively reprograming the fabric and redirect traffic to a path less likely to violate SLAs, such as by pushing the appropriate routing patches to the router(s) involved.

By definition, predictions related to network events in the future are based on accumulated historical data that allows a model to perform such predictions. Not only can some failures for which there are no early signs simply not be predicted, but various predictions (forecasted events) may be contradicted by the (near) real-time detection of changes in the states of the network.

Canceling Predictions Upon Detecting Condition Changes in Network States

The techniques herein augment predictive routing approaches with (near) real-time signals so as to quickly react to state changes that are likely to invalidate predictions that were made when the network was in a different state. In some aspects, a prediction by a predictive routing engine may trigger active monitoring of the states of the path(s) involved. In further aspects, if a set of one or more conditions are met, such as those relating to the benefit of the prediction, the certainty of the prediction, and/or states of the path(s), the prediction by the routing engine can be actively canceled, so as to avoid the undesirable effects of implementing routing decisions based on stale predictions.

Illustratively, the techniques described herein may be performed by hardware, software, and/or firmware, such as in accordance with prediction cancelation process 249, which may include computer executable instructions executed by the processor 220 (or independent processor of interfaces 210) to perform functions relating to the techniques described herein, in conjunction with predictive routing process 248.

Specifically, according to various embodiments, a device obtains an indication of a network event predicted by a routing engine for a network. The device initiates monitoring of one or more network paths associated with the network event, to determine one or more states of the network. The device makes a comparison between the one or more states of the network and a set of one or more constraints. The device provides a prediction cancelation notification to the routing engine, based on the comparison.

Figure 5:
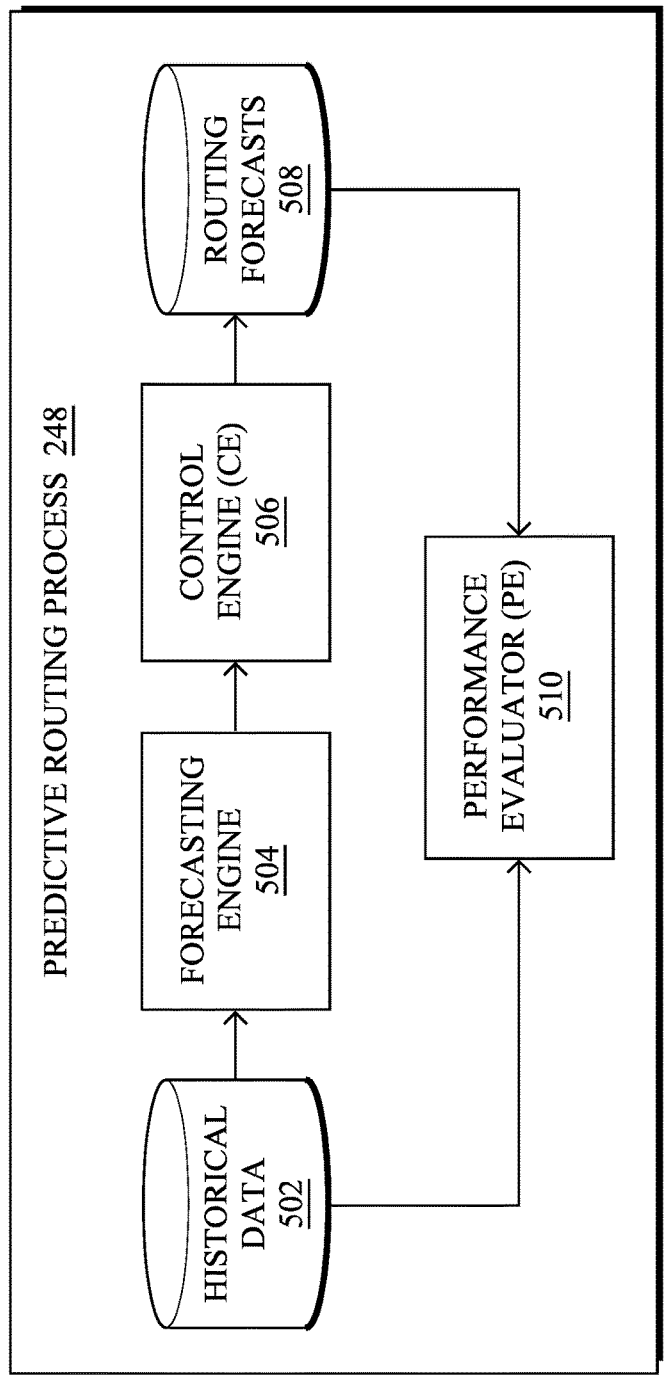
FIG. 5 illustrates an example architecture for a predictive routing engine.

Operationally, FIG. 5 illustrates an example architecture 500 for a predictive routing engine, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like, to provide a supervisory service to the network.

As shown, predictive routing process 248 may include any or all of the following components: historical data 502, a forecasting engine (FE) 504, a control engine (CE) 506, routing forecasts 508, and/or a performance evaluator (PE) 510. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

In this particular instantiation of a predictive routing engine, FE 504 may ingest historical data 502, which may comprise historical traffic data, historical metrics (e.g., QoE, QoS, etc.), etc., to predict future network events. For instance, FE 504 may predict the expected values and uncertainty ranges for QoE (e.g., 1—violation probability), traffic (e.g., number of session minutes), or the like.

CE 506 evaluates the various predictions and determine whether an action should be taken with respect to the predicted network event. For example, CE 506 may compare the expected QoE range for every pair of source-alternate paths and determine that a reroute should occur, if a significantly better range exists. In turn, CE 506 may generate a routing patch to be implemented in the future. Such routing patches may be stored as routing forecasts 508 and indicate a start time and an end time during which the patch is active.

PE 510 may compute the performance of FE 504 and CE 506, once observed QoE and traffic are available. This can be done by grouping the routing patches into three categories: positive (e.g., the QoE significantly improves), harmful (e.g., the QoE significantly decreases), or blank (e.g., there is no significant variation in the QoE). In other words, PE 510 may assess how an applied routing patch actually affected the performance of the network, if at all.

As would be appreciated, the above approach is somewhat limited in that it relies on historical information to decide whether an applied routing path and is associated prediction was helpful, harmful, or neutral. In other words, the assessment of a prediction by FE 504 and action by CE 506 is retrospective in nature and not performed in real-time.

Figure 6:
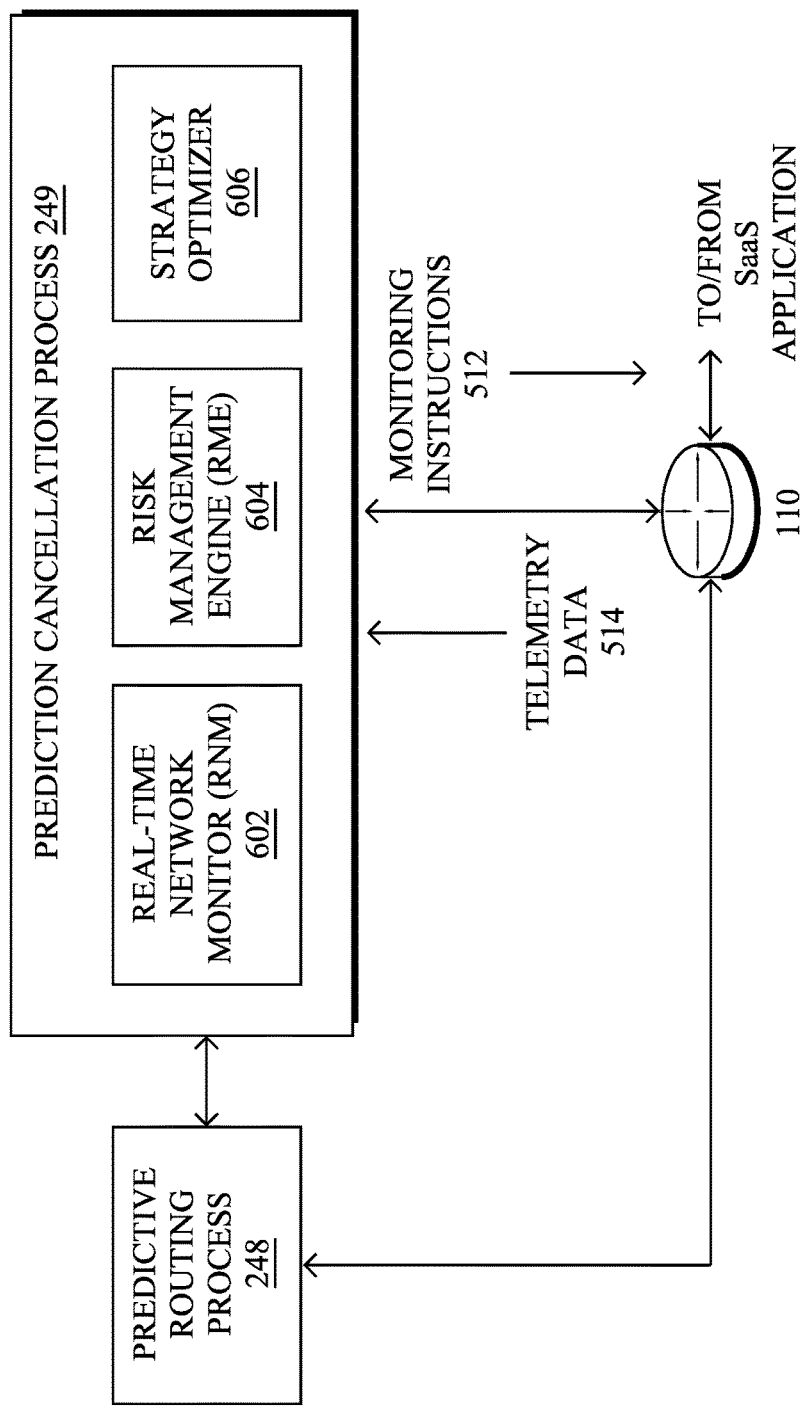
FIG. 6 illustrates an example architecture for canceling a prediction by a predictive routing engine.

FIG. 6 illustrates an example architecture 600 for canceling a predictive routing engine, according to various embodiments. At the core of architecture 600 is prediction cancelation process 249, which may be executed by a controller for a network or another device in communication therewith. For instance, prediction cancelation process 249 may be executed by a controller for a network (e.g., SDN controller 408 in FIGS. 4A-4B), a particular networking device in the network (e.g., a router, etc.), another device or service in communication therewith, or the like, to provide a supervisory service to the network.

As shown, prediction cancelation process 249 may include any or all of the following components: real-time network monitor (RNM) 602, risk management engine (RME) 604, and/or a strategy optimizer 606. As would be appreciated, the functionalities of these components may be combined or omitted, as desired. In addition, these components may be implemented on a singular device or in a distributed manner, in which case the combination of executing devices can be viewed as their own singular device for purposes of executing prediction cancelation process 249.

In general, prediction cancelation process 249 may operate in conjunction with predictive routing process 248 to cancel predictions made by predictive routing process 248. Accordingly, while predictive routing process 248 and prediction cancelation process 249 are shown as separate processes, further embodiments provide for their functionalities to be combined into a singular process or executed in a distributed manner.

During execution, RNM 602 may be responsible for initiating the tracking of specific network states related to a pending prediction by predictive routing process 248. For instance, predictive routing process 248 may make a major prediction related to some SLA violation on a given path happening in x-number of hours along a given path P1 (e.g., path P1 is likely to exhibit SLA violation of application A1, A2, . . . and the prediction is to reroute traffic over a given path P2 between time T1 and T2). In such a case, predictive routing process 248 may send a request to prediction cancelation process 249 that asks RNM 602 to specifically track the state of P1 and inform predictive routing process 248. The tracking process may be a simple as reporting the path state (e.g., P1 went down, . . . ), a change of behavior (e.g., P1 is unstable . . . the number of path changes increased suddenly), or other metric may also monitored (e.g., the predictive engine may provide the typical PDF for some variables related to the path).

To collect the information from the network, RNM 602 may initiate proactive and/or active monitoring of the network, by sending monitoring instructions 512 to the devices or other services responsible for collecting the information. For instance, RNM 602 may send monitoring instructions 512 to router 110, instructing it to perform certain monitoring of the path(s) associated with the prediction by predictive routing process 248. In turn, router 110 may return the requested telemetry data 514. Such monitoring instructions 512 may trigger various actions such as, but not limited to, any or all of the following:

Then the RNM may trigger various actions such as (non-limited to):
Proactive monitoring: since a critical prediction has been made for P1 that a failure will occur in n hours, active probing along P1 and P2 (alternate path) may be started (of frequency may be increased). This allows RMN 602 to obtain indications of any behavioral changes that may occur in the meantime (e.g., the stability of the path seems to increase, etc.). Proactive monitoring may also be applied to a subpart of the path according to the path history. For example, if the path P1 traverses a set of autonomous system numbers (ASNs) and one of the traversed ASNs is known as being unstable, the probing may be limited to a section of the path, or even a specific point to point link (e.g., between autonomous system boundary routers, etc.).
Active monitoring: here, the QoE over paths P1 and P2 may also be triggered by RNM 602. For example, RMN 602 may request to receive states related to all critical applications over P1 and P2 at a higher rate for the next n-number of hours.

Another potential component of prediction cancelation process 249 is RME 604, whose task consists of evaluating the trade-off between benefits, certainty and active state monitoring. The benefit is computed in the form of "savings." For instance, in the case of a predicted SLA violation, RME 604 may determine how impactful such a violation actually will be (e.g., the expected number of minutes of traffic suffering, etc.). For example, this may entail predicting the amount of traffic expected at a given time and remove all predictions of SLA violation that would not impact any traffic (simply because the path is not being used at the time of the prediction). The benefit may be governed by an optional user-configured policy with any or all of the following attributes:

Application type (e.g., list of applications flagged as Highly critical, critical, non-critical)
 Number of unique users affected
 Volume of traffic
 Time of day/week The benefit could then be computed according to the user configured policy using a scalar.

In addition to a benefit constraint, another potential constraint that RME 604 may evaluate is the certainty 'C' of the predicted event occurring. C is the output of the predictive mechanism of FE 504 of predictive routing process 248 computing the degree of confidence in the prediction (e.g., a confidence interval). In some instantiation of predictive routing process 248, the certainty is a relative confidence in SLA violation probability between a path in use and an alternate path, normalized by the root mean square error (RMSE). Said differently, FE 504 of predictive routing process 248 may the algorithm evaluates the probability of SLA violation between two paths taking into account the error of their prediction. Other algorithms may compute the absolute confidence interval of the prediction. The idea of the variable C is to output a degree of confidence in the prediction of an SLA violation or other event occurring for a given path. Note that the variable C may be used in isolation.

A user of prediction cancelation process 249 may also request that the evolution of C be monitored as the states evolve over time closet to the time of the prediction. For example, consider a prediction of SLA failures in n hours (at T+n) for which C has a given value. The user may request that RME 604 keep monitoring the value of C until n' minutes before T+n (the time of the prediction). If C' (certainty at T=T+n−n')<threshold, then the prediction (and any corresponding routing patch) should be canceled. Such a condition may be used if and only if over conditions are satisfied. C may also have different conditions driven by the value of B, the benefit constraint described previously. For example, the minimum requested certainty may be driven by the expected benefit.

In various embodiments, another potential constraint that RME 604 may evaluate relates to the monitoring taken by RMN 602 that is used to gather all network states related to the predicted event. In its simplest form, this may take the form of multiple conditions that must be satisfied for the prediction to be maintained. For example:

Path stability: rate of flaps per minutes (e.g., number of times the path is oscillating). The value −1 may be used to refer to one failure to be sufficient to cancel the prediction.
 Path quality of service: deviation from baseline by a given factor for the delay, loss, jitter, etc.
 Traffic profiles observed on both paths P1 and P2 (e.g., sudden decrease of the traffic routed onto path P1 or conversely sudden increase of the traffic routed over path P2).
 Application QoE observed on path P1 and P2.

For example, consider a prediction of application SLA violation for a path P1 in N hours leading to rerouting traffic to a second path P2. Assume, then, that the following constraints are enforced by RME 604 such that the prediction by predictive routing process 248 should be maintained if and only if:

Benefit: B(Pred(P1)) condition is met (the volume of traffic for a given application over P1 is sufficiently high)
 Certainly: C(Pred(P1)) & C(Pred(P2)) exceed given thresholds
 The active state monitoring is not a reporting a condition used to cancel the prediction (e.g., the path P2 does not start to oscillate, exhibit QoS degradation, path P1 does not fail, . . . ).

Note that such a mechanism is crucial for the correct operation of any predictive engine. Indeed, modifying the routing policy according to prediction is always a delicate task making operation a potentially difficult task for the operation team. Maintaining a prediction that was made when the network was in a different state may be very harmful. For example, proactively rerouting traffic onto a path that is unstable, maintaining a prediction to move traffic from a path is has completely failed, maintaining a prediction for a path no longer carrying traffic, etc.

RME 604 may also register itself to any number of network monitoring agents (e.g., ThousandEyes, etc.) that can be used to report incidents and related root cause issues (e.g., via an API, etc.). In some cases, the root cause of the reported incident may itself be used as a cancellation condition for the prediction (e.g., if the primary path fails, then cancel the prediction).

Optionally, prediction cancelation process 249 may also include strategy optimizer 606, which is used to optimize the cancellation strategy used by RME 604. For instance, strategy optimizer 606 may dynamically adjust the cancelation strategy based on the benefit (B), certainty (C), and/or state tracking (S) constraints described previously. Indeed, more conservative policies would unavoidably lead to cancelling a larger number of predictions, thus reducing the risk of prediction leading to undesirable actions (e.g., issuing a reroute over a path although there is no more traffic to reroute, reroute traffic over a path that is no longer stable, etc.), at the cost of reducing the benefits of the predictive engine since some cancelled predictions may have led to saving traffic from SLA failures.

For example, if the certainty condition is set too high, this may lead to cancelling too many predictions that turned out to be beneficial. In such cases, strategy optimizer 606 may dynamically adjust the minimum conditions met for C using the success rates of the predictions. In its simplest form, if the percentage of canceled predictions is higher than a given value of all predictions that were in fine correct, strategy optimizer 606 may dynamically adjust the threshold used for C. Such a closed-loop mechanism may be used in isolation, even in absence of any new event between the time at which the prediction was made and the prediction time, itself. In this case, such an approach is used to dynamically find the best trade-off between the number of predictions and overall benefit of predictions.

Figure 7:
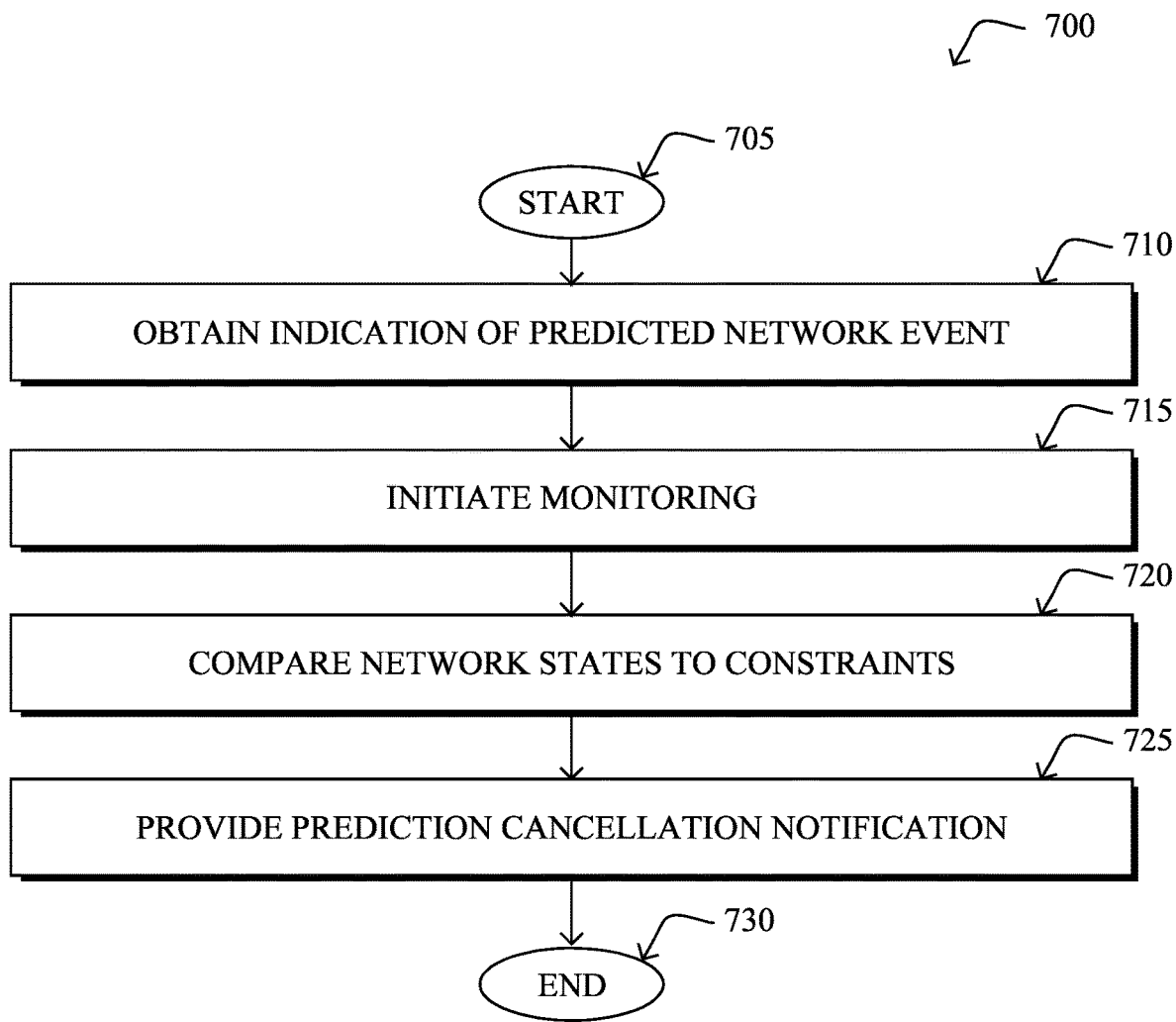
FIG. 7 illustrates an example simplified procedure for canceling a prediction by a predictive routing engine.

FIG. 7 illustrates an example simplified procedure 700 (e.g., a method) procedure for canceling a prediction by a predictive routing engine, in accordance with one or more embodiments described herein. For example, a non-generic, specifically configured device (e.g., device 200), such as controller for a network (e.g., an SDN controller or other device in communication therewith), may perform procedure 700 by executing stored instructions (e.g., predictive routing process 248), to provide a supervisory service to a network. The procedure 700 may start at step 705, and continues to step 710, where, as described in greater detail above, the device may obtain an indication of a network event predicted by the routing engine. For instance, the network event may correspond to an SLA being violated along a first path in the network. In such cases, the predictive routing engine may intend to enact a reroute in the network, to avoid the predicted event from interrupting traffic in the network.

At step 715, as detailed above, the device may initiate monitoring of one or more network paths associated with the network event, to determine one or more states of the network. For instance, the one or more network paths may correspond to the path predicted by the routing engine to exhibit an SLA violation and/or a path to which the routing engine intends to reroute the traffic. In some embodiments, the device may initiate the monitoring by increasing a rate at which an application QoE measurement is obtained for the path(s). In yet another embodiment, the device may do so in part by instructing a router to perform active probing of the one or more network paths.

At step 720, the device may make a comparison between the one or more states of the network and a set of one or more constraints, as described in greater detail above. In general, the constraint(s) define conditions under which the original prediction by the routing engine should be invalidated. For instance, the constraint(s) may include the presence of a network state that contradicts the network event predicted by the routing engine. In other instances, the constraint(s) may comprise at least one of: a threshold flap rate, a threshold path QoS metric (e.g., delay, loss, jitter, throughput, etc.), a change in a traffic profile, or the like. In further embodiments, the constraint(s) may include a threshold amount of reduction in SLA violation time, a threshold certainty associated with the predicted event actually occurring, or the like.

At step 725, as detailed above, the device may provide a prediction cancelation notification to the routing engine, based on the comparison. In various embodiments, the device may do so, to prevent the routing engine from causing traffic along the one or more network paths to be rerouted. In further embodiments, the device may also adjust the set of constraint(s) based on a success rate of prior predictions by the routing engine. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for predictions made by a predictive routing engine to be canceled, to prevent the engine from taking corrective measures based on predictions that are no longer valid due to changes in the network. Doing so can avoid traffic interruptions, resource consumptions, etc., associated with needlessly rerouting traffic.

While there have been shown and described illustrative embodiments that provide for canceling predictions upon detecting condition changes in network states, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, an indication of a network event predicted by a routing engine for a network, wherein the routing engine is configured to reroute, based on the network event, traffic along one or more network paths associated with the network event;
   initiating, by the device, monitoring of the one or more network paths associated with the network event, to determine one or more states of the network;
   making, by the device, a comparison between the one or more states of the network and a set of one or more constraints;
   determining, by the device, that the network event predicted by the routing engine is incorrect based on the comparison; and
   in response to determining that the network event predicted by the routing engine is incorrect, providing, by the device, a prediction cancellation notification to the routing engine that instructs the routing engine that the network event predicted by the routing engine is incorrect, causing the routing engine to prevent the traffic along the one or more network paths associated with the network event from being rerouted based on the network event.

2. The method as in claim 1, wherein the network event predicted by the routing engine corresponds to a service level agreement (SLA) being violated along a first path of the one or more network paths.

3. The method as in claim 2, wherein the routing engine reroutes traffic from the first path to a second path of the one or more network paths.

4. The method as in claim 1, wherein initiating monitoring of the one or more network paths associated with the network event comprises:
   increasing a rate at which an application quality of experience measurement is obtained for the one or more network paths.

5. The method as in claim 1, wherein the set of one or more constraints comprise a network state that contradicts the network event predicted by the routing engine.

6. The method as in claim 1, wherein initiating monitoring of the one or more network paths associated with the network event comprises:
instructing a router to perform active probing of the one or more network paths.

7. The method as in claim 1, wherein the set of one or more constraints comprise at least one of: a threshold flap rate, a threshold path quality of service metric, or a change in a traffic profile.

8. The method as in claim 1, wherein the set of one or more constraints comprise at least one of: a threshold amount of reduction in service level agreement violation time or a threshold certainty associated with the network event predicted by the routing engine.

9. The method as in claim 1, further comprising:
adjusting the set of one or more constraints based on a success rate of prior predictions by the routing engine.

10. An apparatus, comprising:
one or more network interfaces;
a processor coupled to the one or more network interfaces and configured to execute one or more processes; and
a memory configured to store a process that is executable by the processor, the process when executed configured to:
obtain an indication of a network event predicted by a routing engine for a network, wherein the routing engine is configured to reroute, based on the network event, traffic along one or more network paths associated with the network event;
initiate monitoring of the one or more network paths associated with the network event, to determine one or more states of the network;
make a comparison between the one or more states of the network and a set of one or more constraints;
determine that the network event predicted by the routing engine is incorrect based on the comparison; and
in response to determining that the network event predicted by the routing engine is incorrect, provide a prediction cancelation notification to the routing engine that instructs the routing engine that the network event predicted by the routing engine is incorrect, causing the routing engine to prevent the traffic along the one or more network paths associated with the network event from being rerouted based on the network event.

11. The apparatus as in claim 10, wherein the network event predicted by the routing engine corresponds to a service level agreement (SLA) being violated along a first path of the one or more network paths.

12. The apparatus as in claim 11, wherein the routing engine reroutes traffic from the first path to a second path of the one or more network paths.

13. The apparatus as in claim 10, wherein the apparatus initiates monitoring of the one or more network paths associated with the network event by:
increasing a rate at which an application quality of experience measurement is obtained for the one or more network paths.

14. The apparatus as in claim 10, wherein the set of one or more constraints comprise a network state that contradicts the network event predicted by the routing engine.

15. The apparatus as in claim 10, wherein the apparatus initiates monitoring of the one or more network paths associated with the network event by:
instructing a router to perform active probing of the one or more network paths.

16. The apparatus as in claim 10, wherein the set of one or more constraints comprise at least one of: a threshold flap rate, a threshold path quality of service metric, or a change in a traffic profile.

17. The apparatus as in claim 10, wherein the set of one or more constraints comprise at least one of: a threshold amount of reduction in service level agreement violation time or a threshold certainty associated with the network event predicted by the routing engine.

18. A tangible, non-transitory, computer-readable medium storing program instructions that cause a device to execute a process comprising:
obtaining, by the device, an indication of a network event predicted by a routing engine for a network wherein the routing engine is configured to reroute, based on the network event, traffic along one or more network paths associated with the network event;
initiating, by the device, monitoring of one or more network paths associated with the network event, to determine one or more states of the network;
making, by the device, a comparison between the one or more states of the network and a set of one or more constraints; determining, by the device, that the network event predicted by the routing engine is incorrect based on the comparison; and
in response to determining that the network event predicted by the routing engine is incorrect, providing, by the device, a prediction cancelation notification to the routing engine that instructs the routing engine that the network event predicted by the routing engine is incorrect, causing the routing engine to prevent the traffic along the one or more network paths associated with the network event from being rerouted based on the network event.

* * * * *